(12) United States Patent
Puest et al.

(10) Patent No.: US 9,211,668 B2
(45) Date of Patent: Dec. 15, 2015

(54) RECEIVING SYSTEM

(75) Inventors: Wolfgang Puest, Hofheim-Wallau (DE); Rolf Steinmetz, Hofheim-Wildsac (DE)

(73) Assignee: MHT Mold & Hotrunner Technology AG, Hochheim (DE)

( * ) Notice: Subject to any disclaimer, the term of this patent is extended or adjusted under 35 U.S.C. 154(b) by 1641 days.

(21) Appl. No.: 12/223,847

(22) PCT Filed: Feb. 9, 2007
(Under 37 CFR 1.47)

(86) PCT No.: PCT/EP2007/051297
§ 371 (c)(1),
(2), (4) Date: Sep. 21, 2010

(87) PCT Pub. No.: WO2007/093566
PCT Pub. Date: Aug. 23, 2007

(65) Prior Publication Data
US 2011/0042855 A1 Feb. 24, 2011

(30) Foreign Application Priority Data
Feb. 18, 2006 (DE) .......... 10 2006 007 639

(51) Int. Cl.
*B29C 45/72* (2006.01)
*B29C 49/64* (2006.01)
(Continued)

(52) U.S. Cl.
CPC ......... *B29C 45/7207* (2013.01); *B29C 49/6463* (2013.01); *B29B 11/08* (2013.01); *B29B 11/14* (2013.01); *B29B 2911/1402* (2013.01); *B29B 2911/1404* (2013.01);
(Continued)

(58) Field of Classification Search
CPC ............ B29C 45/7207; B29C 2045/7214; B29C 2045/7221; B29C 2045/7228; B29C 2045/725; B29C 49/6463
See application file for complete search history.

(56) References Cited

U.S. PATENT DOCUMENTS 5,232,715 A * 8/1993 Fukai ........................... 425/526
6,663,813 B2 12/2003 Neter
(Continued)

FOREIGN PATENT DOCUMENTS

DE 3508997 10/1985
DE 69713533 T2 2/2003
(Continued)

*Primary Examiner* — Ryan Ochylski
(74) *Attorney, Agent, or Firm* — Michael L. Dunn

(57) ABSTRACT

A system and method for post-treatment of a hollow body molding produced in an injection molding mold. A receiving finger is provided with a first end and a second end. The receiving finger is designed that it can engage into the hollow body molding. The outside shape of the receiving finger substantially corresponds to inside shape of the hollow body molding so that the receiving finger (5) can hold the hollow body molding. Preferably, the outside diameter of the receiving finger is substantially equal to inside diameter of the hollow body molding in a cooled condition so that the hollow body molding can be removed from the receiving finger even after shrinkage. Desirably, the outside diameter of the receiving finger is between about 0.01 mm and about 1 mm and preferably about 0.1 to about 0.5 mm smaller than the inside diameter of the hollow body preform in the removal condition so that the hollow body molding can be removed from the receiving finger even after shrinkage. An apparatus is desirably provided for at least one of cooling and heating the hollow body molding so that the hollow body molding can be selectively cooled or heated by means of the system.

16 Claims, 8 Drawing Sheets

(51) Int. Cl.
  *B29B 11/08* (2006.01)
  *B29B 11/14* (2006.01)
  *B29C 49/06* (2006.01)
  *B29C 35/16* (2006.01)
  *B29K 67/00* (2006.01)
  *B29K 105/00* (2006.01)

(52) U.S. Cl.
  CPC ............... *B29B 2911/14026* (2013.01); *B29B 2911/14033* (2013.01); *B29B 2911/1444* (2013.01); *B29B 2911/14106* (2013.01); *B29B 2911/14133* (2013.01); *B29B 2911/14326* (2013.01); *B29B 2911/14333* (2013.01); *B29B 2911/14466* (2013.01); *B29C 49/06* (2013.01); *B29C 49/6436* (2013.01); *B29C 2035/1666* (2013.01); *B29K 2067/00* (2013.01); *B29K 2105/253* (2013.01)

(56) References Cited

U.S. PATENT DOCUMENTS

| | | | |
|---|---|---|---|
| 2003/0205841 A1* | 11/2003 | Neter | 264/237 |
| 2004/0113326 A1* | 6/2004 | Gernhuber et al. | 264/492 |
| 2005/0042324 A1 | 2/2005 | Unterlander et al. | |
| 2006/0138696 A1* | 6/2006 | Weinmann | 264/237 |

FOREIGN PATENT DOCUMENTS

| | | |
|---|---|---|
| EP | 0794045 B1 | 6/2002 |
| JP | 2000346812 A * | 12/2000 |
| WO | WO99/50039 | 10/1999 |
| WO | WO99/58313 | 11/1999 |
| WO | WO2004/041510 | 5/2004 |
| WO | WO2006/060893 | 6/2006 |

* cited by examiner

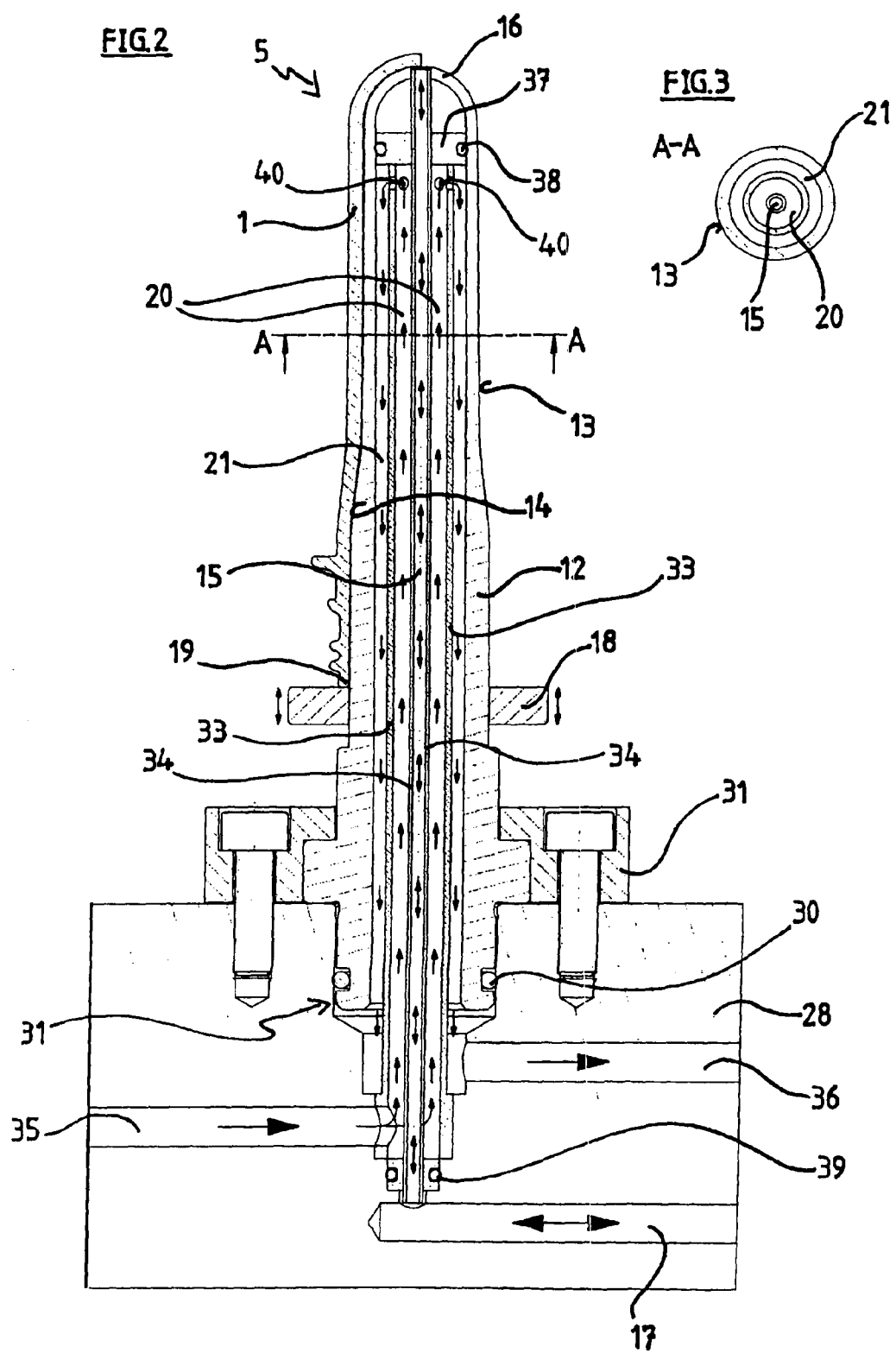

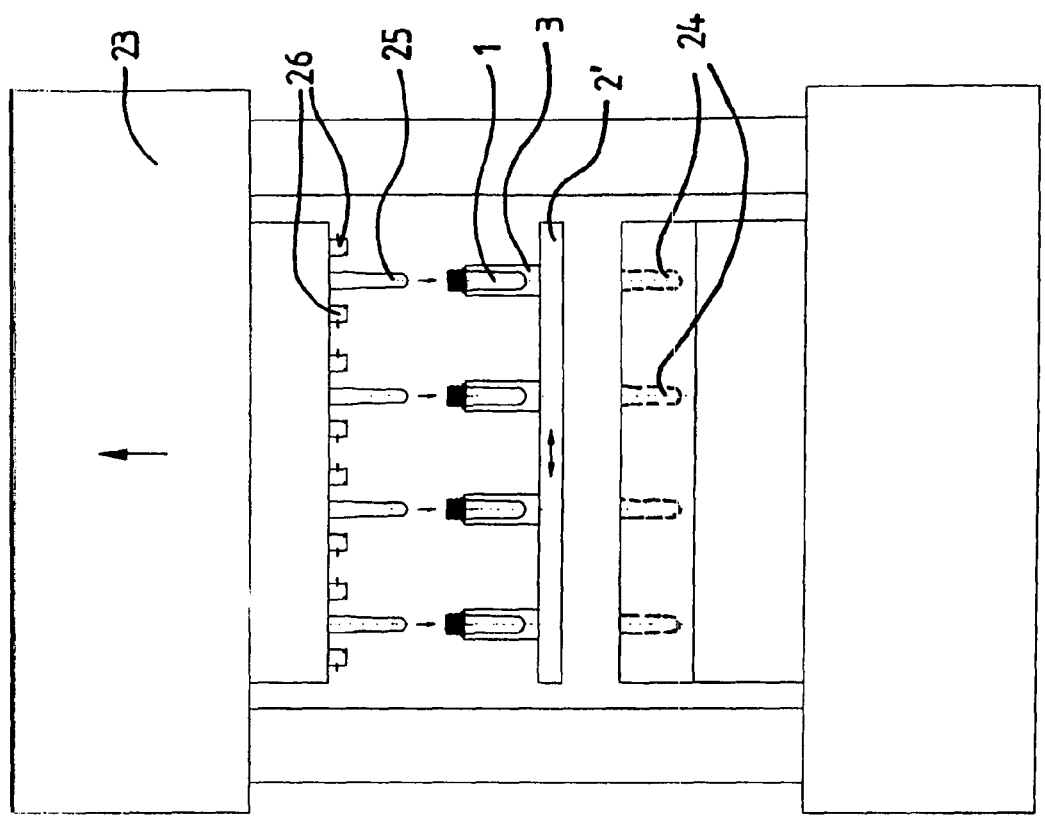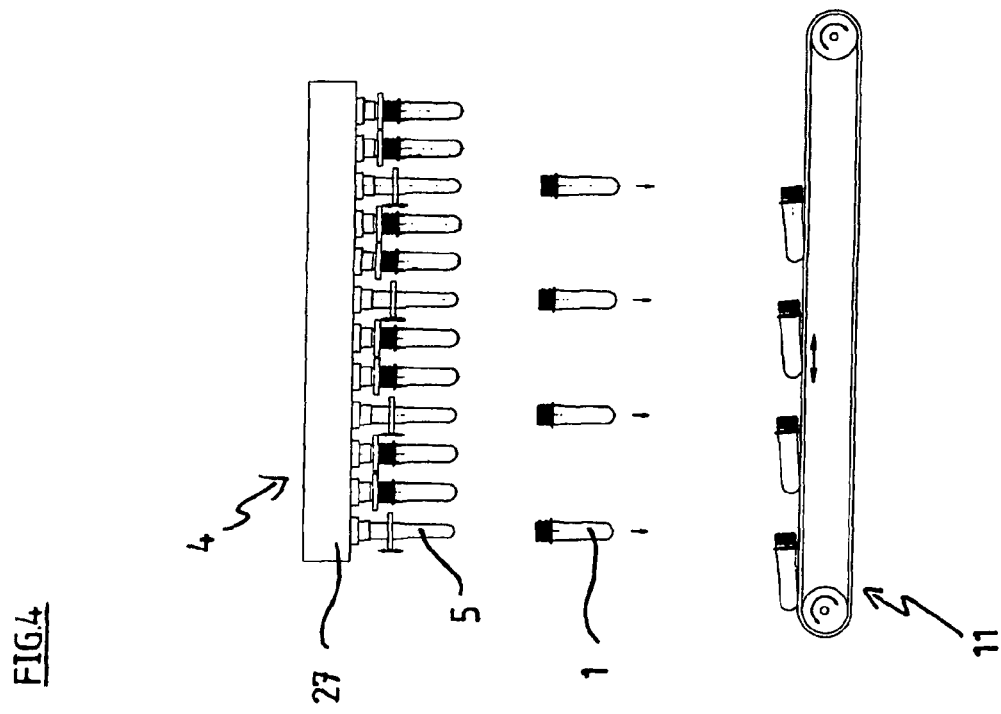
FIG.4

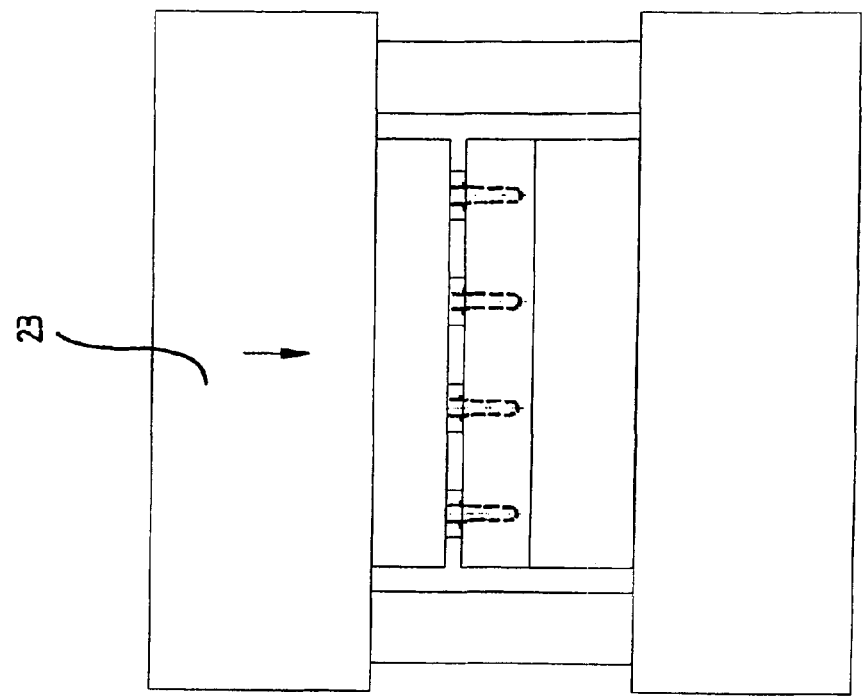
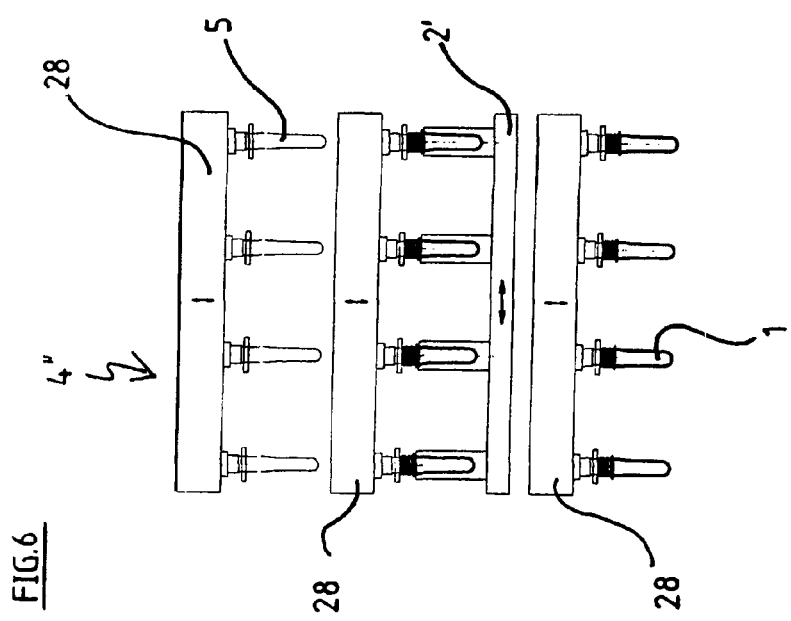
FIG.6

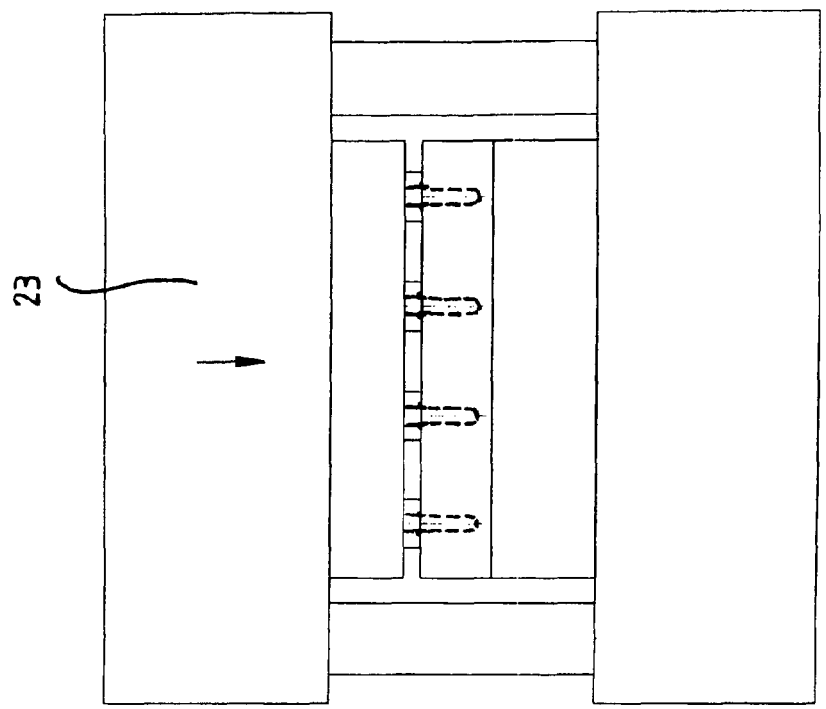
FIG.7
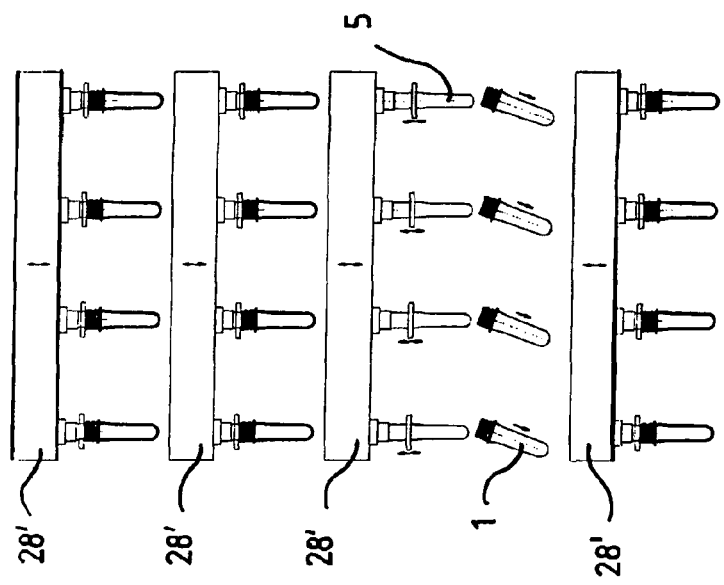

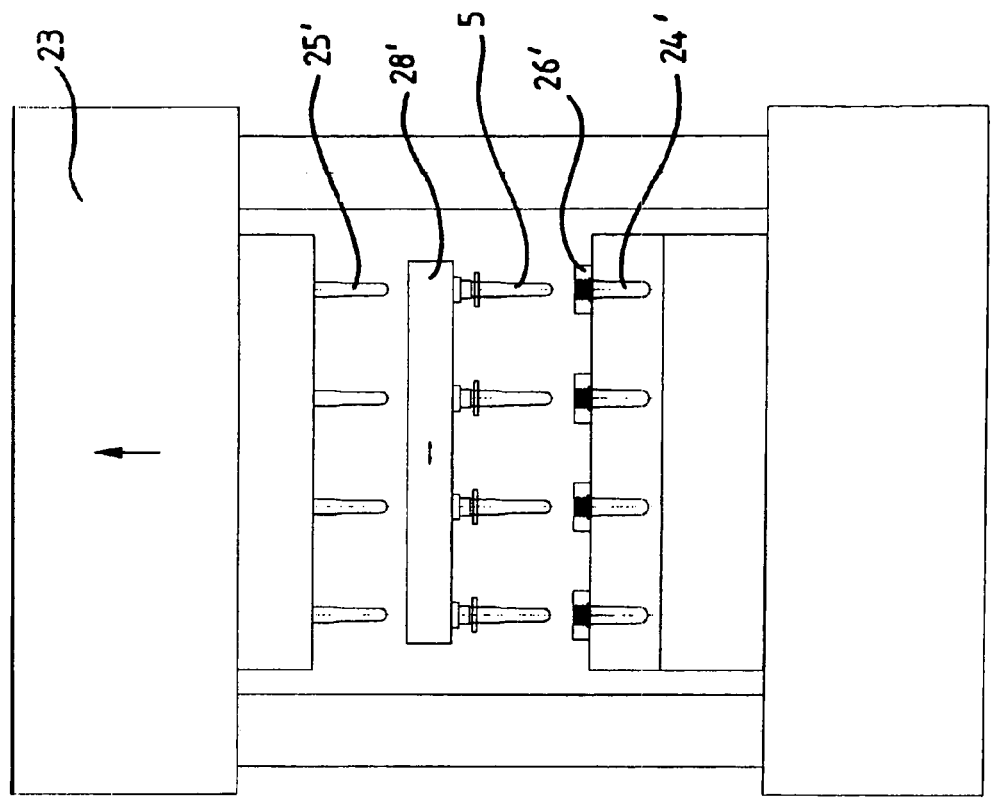
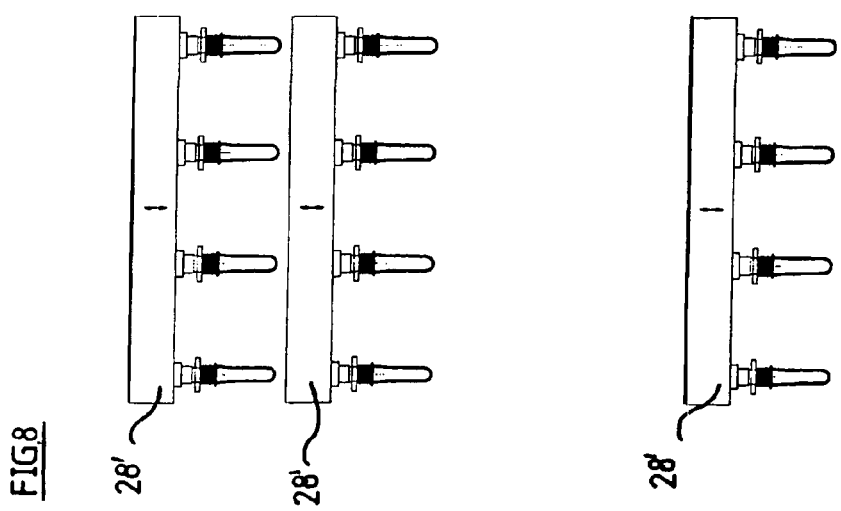
FIG 8

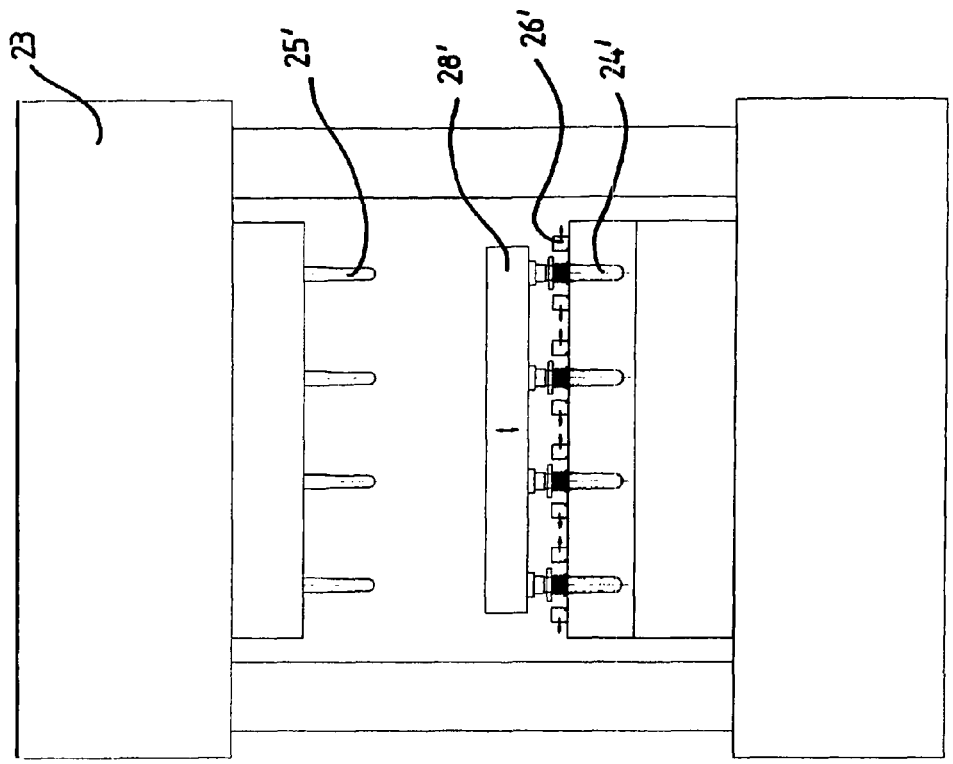
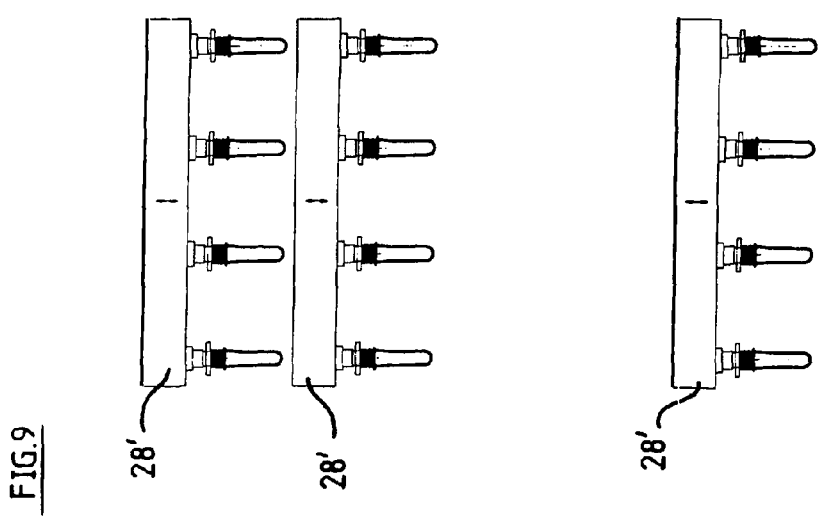
FIG.9

RECEIVING SYSTEM

BACKGROUND OF THE INVENTION

The present invention concerns a receiving system for the post-treatment of a hollow body molding produced in an injection molding mold, and a corresponding method.

Moldings or preforms of plastic materials are produced in large numbers using injection molding methods. Particular significance is attributed to the production of hollow body moldings, referred to as preforms, of PET (polyethylene terephthalate), as the foundation for the production of PET drinks bottles. After the injection molding procedure is concluded the hollow body moldings are inflated to the desired final dimension at the same location or another location by blow molding.

Injection molding machines having tools which have a large number of mold cavities, for example 48, are used for injection molding of the hollow body moldings. Therefore at the moment up to 192 moldings can be produced in parallel in respect of time during a single injection molding cycle. As the number of mold cavities is subjected to a limit by virtue of the limited spatial dimensions of the closure units of injection molding machines, the cycle time, that is to say the time required to produce a molding in a mold cavity, must be shortened to provide an increase in the number of moldings which can be produced in a time interval. In that respect the procedure adopted has been to remove the moldings from the injection molding mold progressively earlier within the injection molding cycle in order to be able to use the mold for the next injection step. In spite of cooling the individual mold cavities the moldings, at earlier moments of removal of the moldings from the mold cavities, have still not cooled down to such an extent that they can be removed without the risk of deformation. Admittedly the moldings are externally cooled down to such a degree that they have a stable outside contour, but the plastic material in the interior of the moldings is still fluid. If the dissipation of heat from the surface of the moldings is interrupted, the plastic material at the surface of the moldings also liquefies again by virtue of the transport of heat out of the interior of the moldings to the surface. Therefore, in the removal operation and in the immediately subsequent phase, care must be taken to provide that the moldings do not experience any deformation and the moldings are further cooled subsequently to removal thereof from the mold cavities.

Further cooling and thus complete hardening of the moldings is then effected outside the actual mold cavities and outside the closure unit so that they are available for the next injection molding operation.

The tools known from the state of the art for preforms for the production of bottles are so arranged that the mold cavities are filled from the closed end of the moldings. In that way the feedhead for the bottles is disposed on the one hand in the bottom region of the bottle which is not directly visible to the end consumer, while on the other hand the oppositely disposed end of the preform, that is to say the bottle neck with the screwthread, is extremely critical in terms of dimensional accuracy so that no further post-treatment is effected after the injection molding operation at that end.

The individual mold cavities for the preforms comprise generally at least three parts: a cavity which forms the outside shape for the belly portion of the preform, a neck jaw which is in two parts and which in the closed condition forms the mold for the neck, that is to say generally for the screwthread as well as the carrying ring and the sealing ring of the bottle, and a core which defines the inside surface of the preform.

In order to remove the finished hollow body molding from the mold cavity, the molding together with the core is usually withdrawn from the cavity forming the outside shape of the preform, in which case the neck jaw is closed so that it holds the molding on the core. The removal plate is then moved with a removal sleeve or cavity into the region under the molding, while in a further step the neck jaw, that is to say the mold for the bottle neck, is opened by laterally moving the two halves into the open position so that the molding can slip off the core of the mold and drops into the removal cavity or is moved thereinto by means of a compressed air pulse. After the removal plate has been removed from the closure unit the tool is available for the next injection molding operation. If the tool has a plurality of mold cavities a corresponding number of removal cavities is provided in the removal plate.

The foregoing description relates to what is known as a vertical system in which the closure unit closes in a vertical direction. Therefore the mold cavities also extend substantially in a vertical direction so that the force of gravity can be used for withdrawing the moldings from the cores. As an alternative thereto there are also horizontal systems, the closure units of which close in a horizontal direction. In that case the mold cavities also extend substantially horizontally. In horizontal systems therefore the moldings are frequently withdrawn from the core by means of additional forces, for example by compressed air or by a mechanical gripper.

A post-treatment of the molding takes place in the removal cavity, that is to say it is cooled down here until it has reached its entire stability and a glass-like, that is to say transparent and clear, structure for the molding can be guaranteed.

The state of the art, in particular U.S. Pat. No. 6,475,422 B1, also discloses removal systems in which, in addition to cooling of the removal cavity, a cooling finger is introduced into the interior of the molding, the cooling finger cooling the molding from its inside by means of an air flow. In that case contact with the inside of the molding is avoided in order not to constitute any further sources of deformation.

In the removal systems known from the state of the art, the cooling effect is transmitted to the moldings only to a limited degree as, by virtue of shrinkage of the PET material when cooling occurs, there is only imperfect contact between the removal cavity and the molding.

In addition the neck region of the hollow body molding cannot be cooled in thermal contact with the cavity by virtue of undercut configurations due to the screwthread and the neck ring, but only by a complicated and expensive air shower effect, that is to say by guiding an air flow past the outside of the neck of the molding.

BRIEF SUMMARY OF THE INVENTION

The invention is a system and method for post-treatment of a hollow body molding produced in an injection molding mold. A receiving finger is provided with a first end and a second end. The receiving finger is designed that it can engage into the hollow body molding. The outside shape of the receiving finger substantially corresponds to inside shape of the hollow body molding so that the receiving finger (5) can hold the hollow body molding. Preferably, the outside diameter of the receiving finger is substantially equal to inside diameter of the hollow body molding in a cooled condition so that the hollow body molding can be removed from the receiving finger even after shrinkage. Desirably, the outside diameter of the receiving finger is between about 0.01 mm and about 1 mm and preferably about 0.1 to about 0.5 mm smaller than the inside diameter of the hollow body preform in the removal condition so that the hollow body molding can be removed from the receiving finger even after shrinkage. An apparatus is desirably provided for at least one of cooling and heating the hollow body molding so that the hollow body molding can be selectively cooled or heated by means of the system.

BRIEF DESCRIPTION OF THE SEVERAL VIEWS OF THE DRAWINGS

FIG. 2 shows an axial cross-sectional view through a preferred embodiment of the receiving finger according to the invention, FIG. 3 shows a radial sectional view through the receiving finger of FIG. 2, FIG. 4 shows an alternative embodiment of the receiving system during ejection of a set of hollow body moldings from the cores and during removal of hollow body moldings from the tool, FIG. 6 shows a further embodiment of the receiving system, FIG. 7 shows a further alternative embodiment of the receiving system, FIG. 8 shows a view of the receiving system of FIG. 7 when the closure unit is opened, and FIG. 9 shows a further view of the receiving system of FIGS. 7 and 8 during another working step.

DETAILED DESCRIPTION OF THE INVENTION

Figure 1:
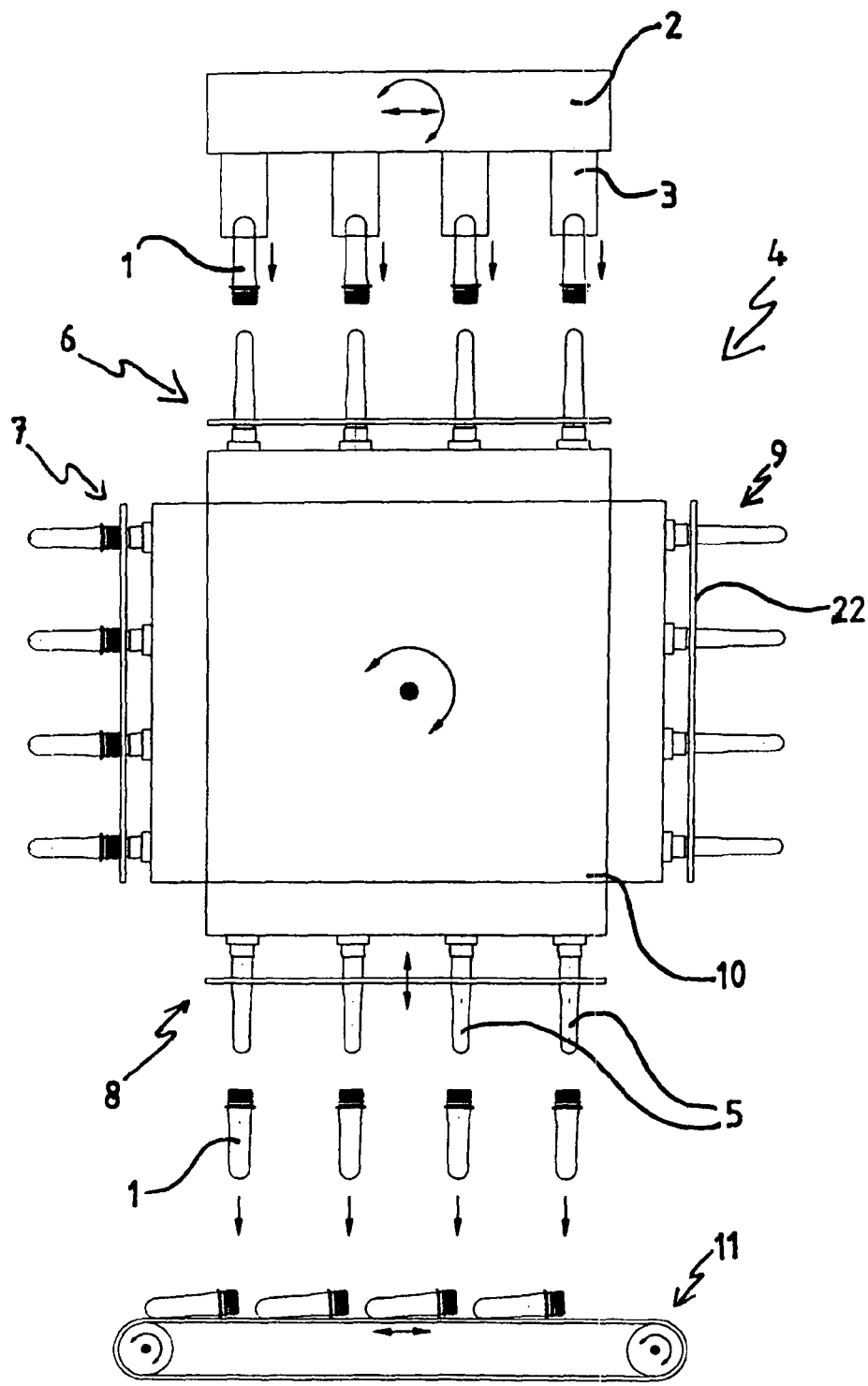
FIG. 1 diagrammatically shows a preferred embodiment of the receiving system according to the invention.

In comparison therewith the object of the present invention is to provide a receiving system for the post-treatment of a molding produced in an injection molding mold, which avoids the above-indicated disadvantages and permits more rapid cooling of the molding but in particular the neck region thereof.

According to the invention that object is attained in that there is provided a system for the post-treatment of a hollow body molding produced in an injection molding mold, wherein the system has a receiving finger with a first end and a second end and wherein the receiving finger is so designed that it can engage into the hollow body molding, wherein the outside shape of the finger substantially corresponds to the inside shape of the molding, that is to say it is complementary thereto, so that the receiving finger can hold the hollow body molding.

In that way it is possible to achieve optimum thermal contact between the receiving finger and the inside wall of the molding in all regions of the latter.

In that respect it is desirable if the outside diameter of the receiving finger is substantially equal to the inside diameter of the molding in the cooled condition. In that way the receiving finger has only a slight influence on shrinkage of the material upon cooling and the molding can be removed from the receiving finger after cooling, by a comparatively low force.

In order to keep the removal forces when removing the molding from the receiving finger as low as possible, it is desirable if the outside diameter of the finger is substantially between 0.01 mm and 1 mm, preferably between 0.1 mm and 0.5 mm, smaller than the inside diameter of the molding to be removed, in the removal condition. In that case the term removal condition is used to denote the condition in which the hollow body molding is removed from the cavity and transferred to the post-treatment system. In that condition the molding is still hot at least in its interior and the material shrinks upon cooling.

The receiving system according to the invention is preferably adapted for receiving the hollow body molding outside the closure unit of the injection molding machine, wherein the hollow body molding is transferred from a removal plate to the receiving system.

Alternatively thereto the receiving system can be designed in such a way that it is adapted as a removal plate for removal of the moldings from the tool in the interior of the closure unit. That embodiment of the receiving system with a receiving finger firstly allows the molding to be left in the molding cavity of the mold cavity structure, upon removal from the mold, with the neck jaws remaining closed while the mold core is withdrawn from the molding. Subsequently either the neck jaws are opened so that the molding can drop out of the molding cavity on to the receiving finger or the receiving finger is introduced into the molding, the neck jaws are opened and then the molding is removed on the receiving finger from the molding cavity in the mold cavity structure.

By virtue of shrinkage of the plastic material upon cooling of the molding the molding is shrunk on to the receiving finger, whereby good thermal contact is maintained between the receiving finger and the inside wall of the molding.

That contact is present in particular also in the neck region of the molding, that is to say in the region in which the neck ring as well as the screwthread on the bottle are disposed. In that way, more rapid cooling of the molding also and in particular in the neck region of the molding is achieved in the receiving system according to the invention, than in the removal systems known from the state of the art. Depending on the respective configuration of the invention that is adopted it is possible to dispense with an additional air shower effect in the neck region of the molding.

To cool the molding it is advantageous if the receiving finger has a cooling means. In addition however it may be desirable if alternatively or additionally there is provided a means for heating the molding. In that way the molding can be heated again after reaching its condition of being stable in respect of shape and can then be fed to the next production step, that is to say the blow molding operation.

In that respect it is desirable if heating of the molding is preferably effected in defined portions, for example the bottle belly portion, while other regions, for example the bottle neck which may no longer experience deformation during further processing are cooled. If, in that process, the molding is cooled below a given critical temperature before again being heated up, the bottles produced in that way exhibit enhanced stability.

A particularly preferred embodiment of the invention is one in which the means for cooling and/or heating has a through-flow passage for a fluid, which can be connected to the means for producing a cooled or heated fluid flow. Such a through-flow passage can selectively have a heated or a cooled fluid flowing therethrough so that said passage can be used both for heating and also cooling the molding. Alternatively or additionally the heating means can be an electrical heating means and/or an infrared lighting means which are integrated into the receiving finger. It is also possible for the finger to be cooled by means of a piezo cooling arrangement.

In order additionally to achieve cooling of the molding from its outside it is advantageous if the receiving system in addition to the receiving finger has a post-treatment sleeve which is movable relative to the receiving finger in such a way that it encloses the receiving finger as well as the hollow body molding arranged thereon. In that respect it is desirable if the post-treatment sleeve is in the form of a cavity, the inside wall of which approximately corresponds to the outside shape of the hollow body molding.

In a particularly preferred embodiment of the invention the receiving finger has a holding means for the molding.

In the simplest configuration such a holding means has at least one opening in the receiving finger, which can be connected to a vacuum means. In that way the molding can be subjected to suction and held by the receiving finger.

To avoid deformation of the molding it is particularly desirable if in addition the system has a spacing means which is so adapted that the large part of the inside surface of the molding does not come into contact with the outside surface of the receiving finger.

A particularly preferred embodiment therefore is one in which the spacing means includes at least one opening in the receiving finger, which can be connected to a fluid feed. By means of a continuous flow of fluid the molding is held on an air cushion at a defined spacing relative to the receiving finger. That way of contact-lessly holding the molding on the receiving finger minimises the deformation which the molding experiences during removal from the molding cavity and/or during the cooling process. In that respect it is desirable if the spacing means ensures a spacing of between about 0.5 mm and about 10 mm, preferably between 1 mm and 5 mm, between the inside surface of the molding and the outside surface of the receiving finger.

If the spacing means is formed by an opening in the receiving finger, which can be connected to a fluid feed, it is desirable if the receiving system has a means for heating and/or cooling of the fluid flow. Thus cooling or heating of the molding can be implemented directly by the fluid flow used for holding the molding.

If, when cooling or heating the hollow body molding by means of a fluid flow, at the same time the receiving finger is cooled or heated, for example with an electric heating or cooling arrangement, a homogeneous temperature control for the molding is achieved, as the fluid flow which flows past the receiving finger is held at a substantially constant temperature, in spite of heat being absorbed or delivered, by the hollow body molding.

A preferred embodiment of the invention is one in which the at least one opening which can be connected to a vacuum means (as a holding means) and/or a fluid feed (as a spacing means) is arranged in the proximity of the first end of the finger.

A particularly preferred embodiment of the invention however in which the receiving finger at least portion-wise comprises a porous material which has the at least one opening. In that way an air cushion on which the molding is held is formed when a fluid exits through the porous material.

A particularly preferred embodiment of the invention is one in which the receiving finger has an abutment for a hollow body molding so that the open end of the hollow body molding is supported thereon. That prevents the hollow body molding stretching on the receiving finger beyond a desired amount by virtue of the gravity acting thereon.

In a preferred embodiment the abutment is adjustable. In that way it is possible to adjust the extent to which the receiving finger penetrates into the hollow body molding. That is advantageous in particular in the embodiment in which it is provided that the hollow body molding after cooling comes into contact in as areal relationship as possible with the receiving finger. More specifically, if it turns out during operation that the hollow body moldings after cooling are excessively firmly carried on the receiving finger and can therefore only be removed with difficulty, the abutment can be displaced in such a way that the receiving finger no longer engages so far into the hollow body molding. If now the outside contour of the receiving finger or the inside contour of the hollow body molding is of a slightly conical configuration, the result of this is that the spacing between the 'hot' hollow body molding and the receiving finger can be adjusted by displacement of the abutment. The further the receiving finger engages into the hollow body molding, the better is the cooling action by virtue of the direct contact between the receiving finger and the 'cold' hollow body molding; then however the hollow body molding is also correspondingly more firmly fixed on the receiving finger. A compromise is therefore to be achieved between good cooling efficiency on the one hand and good removability of the hollow body molding from the receiving finger on the other hand.

It is particularly desirable if the abutment is in the form of a support ring or a plate which embraces the receiving finger in the proximity of the second end of the receiving finger in ring form. In that way the open end of the hollow body molding can be supported over its entire periphery.

A particularly preferred embodiment of the invention is one in which the receiving finger has an ejection means which makes it possible for the cooled hollow body molding to be stripped from the receiving finger.

Desirably such an ejection means is formed by an opening in the receiving finger, which can be acted upon with a fluid flow so that the hollow body molding can be stripped from the receiving finger by a fluid pulse.

Alternatively or in addition the ejection means can have a means which embraces the receiving finger in the proximity of its lower end and is movable axially along the finger. In that movement the mouth region of the hollow body molding or the edge region of the neck ring is engaged and the molding is stripped off.

In that case it is advantageous if the ejection means is formed from the support ring or the plate of the abutment.

A particularly preferred embodiment of the invention is one in which the system for the post-treatment of a hollow body molding has at least one arrangement of receiving fingers, wherein the number of receiving fingers in the arrangement corresponds to the number of hollow body moldings produced simultaneously in the injection molding apparatus or integral multiples thereof. In that way all moldings simultaneously produced in the injection molding tool of the injection molding apparatus can be removed all at once and received by the receiving system.

Furthermore the object of the invention is attained by the method according to the invention of post-treatment of a hollow body molding produced in an injection molding mold, wherein the molding is transferred to a receiving finger and the hollow body molding is held by the receiving finger which engages into the molding.

In that respect a preferred embodiment of the method is one in which the hollow body molding is removed from the tool of the injection molding machine by means of a removal plate and transferred to the receiving finger outside the injection molding machine.

As an alternative thereto the molding can be removed from the tool of an injection molding machine by means of the receiving finger, wherein the receiving system operates as a removal system. In contrast to the methods known from the state of the art, that variant of the method according to the invention provides that firstly the core of the injection molding mold is withdrawn from the hollow body molding. In that case the neck jaws remain on the cavity plate and the neck jaws which are closed at that time hold the hollow body molding in the cavity of the injection molding mold. After opening of the neck jaws the molding can be removed from the cavity of the injection molding mold, with the receiving finger of the receiving element engaging into the interior of the molding. In comparison, in the case of the methods known from the state of the art, the moldings slip into the cavity of a removal plate.

It is advantageous in that respect if the hollow body molding is held in a substantially contact-free manner by the receiving finger. In that respect it is desirable if a spacing between the inside surface of the hollow body molding and the outside surface of the receiving finger of between about 1 mm and about 10 mm is guaranteed.

A particularly preferred embodiment of the method according to the invention is one in which the hollow body molding is at least portion-wise cooled on the receiving finger. In that respect it is particularly desirable if a first portion of the hollow body molding is set to a first temperature $T_1$ and a further portion of the hollow body molding is set to a second temperature $T_2$, wherein $T_1$ is higher, preferably at least 10° C. higher and particularly preferably at least 20° C. higher, than $T_2$. That temperature difference is desirable in particular if the belly portion of the bottle is inflated after conclusion of the injection molding operation, that is to say it must be heated while the bottle neck is not subjected to further processing and can therefore remain cold.

Further advantages, features and possible uses of the present invention will be apparent from the following description of a preferred embodiment and the Figures relating thereto.

FIG. 1 diagrammatically shows the receiving system according to the invention for the post-treatment of a plurality of hollow body moldings produced in an injection molding mold, wherein the description of the Figure represents in particular the function of the receiving system within the production procedure.

In the illustrated embodiment the hollow body moldings 1 produced in an injection molding mold of an injection molding machine are removed from the mold cavities of the injection molding mold by means of a removal plate 2. The hollow body moldings 1 are what are referred to as preforms or blanks for the production of PET bottles. The preforms 1 are removed from the mold cavities of the injection molding mold by means of removal cavities 3 in the removal plate 2. For that purpose the removal plate 2 can be moved into the closure unit of the injection molding machine. Outside the injection molding machine the preforms 1 are transferred from the removal plate 2 to the receiving system 4 according to the invention. For that purpose the receiving system 4 has receiving fingers 5 which engage as a core into the interior of the preforms 1 and hold the preforms 1. The illustrated configuration of the receiving system 4 has four sets 6 through 9 of receiving fingers 5 arranged on a rotatably mounted cube 10.

In the illustrated embodiment a respective set of receiving fingers 6 through 9 is arranged on one of the side surfaces of the cube 10. In the randomly selected initial position of the receiving system 4 the receiving finger set 6 is in the transfer position in which the receiving fingers 5 receive the preforms 1 from the removal plate 2. For that purpose the receiving system 4 or the removal plate 2 is selectively moved in such a way that the receiving fingers project into the interior of the preforms 1, hold them fast and remove them from the removal cavities 3 by suitable displacement of the receiving system 4 or the removal plate 2.

In a subsequent working step the cube 10 of the removal system 4 is rotated in such a way that the next free set 9 of receiving fingers 5 is rotated into the receiving position while the set 6 fitted with preforms 1 is now rotated into the position of the set 7 in the view in FIG. 1. In that position the preforms 1 which have been received by the receiving fingers 5 of the set 6 can cool down. When the required cooling is attained the preforms are rotated into the stripping position in which the set 8 of receiving fingers 5 is disposed in FIG. 1. Here the preforms 1 are stripped off the receiving fingers 5 and can be transported away for further processing, for example with a conveyor belt 11.

Alternatively it is possible for the cube 10 to be rotated in such a way that the residence time of the hollow body preforms 1 on the fingers 5 is prolonged. For that purpose it is necessary for each preform, during its residence time on a finger 5, to be firstly moved into the position of the set 7 and then into the position of the set 9 as shown in FIG. 1. Additional rotary movements of the cubes through 180° and 270° respectively are required for that purpose.

The illustrated diagrammatic view shows a receiving system having four sets each of 16 receiving fingers 5 arranged in a 4×12 matrix on the side surfaces of the cube 10 of the receiving system 4. Other arrangements of the receiving fingers are possible, in which respect the number and arrangement of the fingers corresponds to the number and arrangement of the removal cavities of the removal plate.

For the sake of enhanced clarity elements in the Figures described hereinafter, which are identical or similar to elements in FIG. 1, are denoted by the same references or references with a prime.

Figure 5:
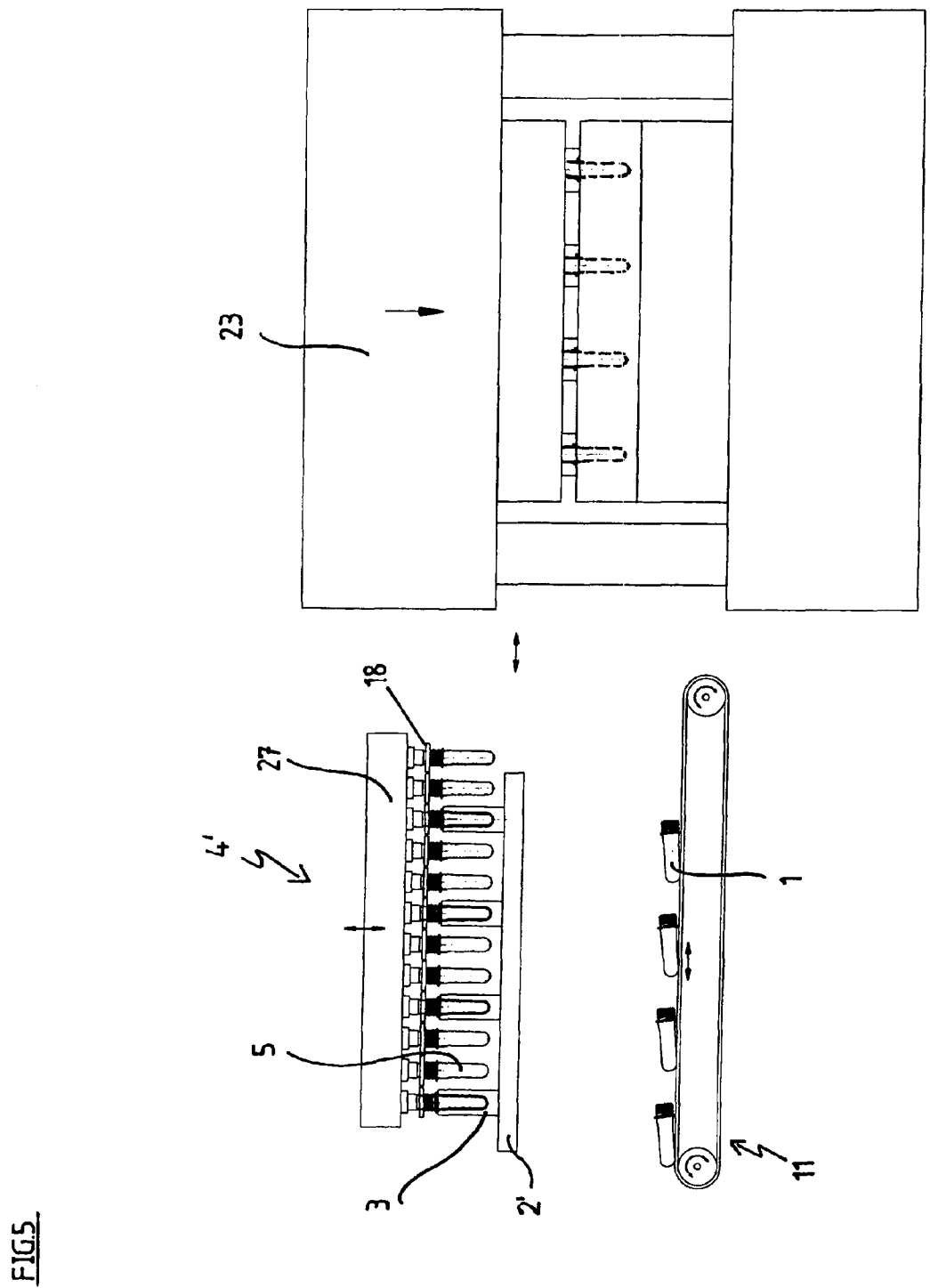
FIG. 5 shows the receiving system of FIG. 4 during transfer of the hollow body moldings to the pins for the post-treatment.

FIGS. 4 and 5 show an alternative embodiment of the receiving system 4' according to the invention for the post-treatment of the moldings 1. The views in FIGS. 4 and 5, besides the receiving system 4', also show the closure unit 23 of the injection molding machine and the removal plate 2' of the system.

FIG. 4 shows the vertical closure unit 23 of the injection molding machine in the opened condition. For that purpose firstly the cavities 24 of the mold cavity structure on the one hand and the cores 25 as well as the neck jaws 26 on the other hand are hydraulically separated from each other. In order to be able to remove the moldings 1 which after opening of the mold are held by the neck jaws 26 on the cores 25 the removal plate 2' has been introduced into the closure unit 23 so that the receiving cavities 3 of the removal plate 2' are arranged beneath the cores 25 of the mold. The moldings are released by the neck jaws 26 being moved away from each other and they are removed from the cores by the force of gravity and received in the receiving cavities 3 in the removal plate 2'. Alternatively removal from the cores can also be effected pneumatically, by means of a stripping plate or by means of a gripper connected to the removal plate.

The three-stage post-cooling plate also shown in FIG. 4 has cooling fingers 5 which are arranged at a spacing from each other that is equal to a third of the spacing between the receiving cavities 3 of the removal plate 2'. In that way, in the transfer of the moldings from the removal plate 2' to the fingers 5 of the post-cooling plate 27, only each third finger 5 is fitted therewith. That transfer procedure for transfer from the removal plate 2' to the fingers 5 of the receiving system is shown in FIG. 5. In this case each finger 5 has a separately actuable stripping ring 18 so that the moldings 1 on the fingers 5 can be selectively ejected. In that way the receiving system 4' can be operated in a three-stage mode, wherein, while a first set of moldings 1 is being cooled down, a second set of moldings is received on the same plate 27, while shortly thereafter a third set of moldings 1, which has already cooled down, is ejected on to a conveyor belt 11.

Besides the transfer of the moldings 1 from the removal plate 2' to the fingers 5 of the post-cooling plate 27, FIG. 5 again shows the closure unit 23 in the closed condition so that the injection molding operation for the next set of moldings 1 is already taking place in the tool.

FIG. 6 shows a further embodiment of the receiving system 4" according to the invention for cooling of the moldings 1 together with the closure unit 23. The receiving system comprises a plurality of post-cooling plates 28, being three thereof in the illustrated embodiment, which are successively fitted with hollow body moldings by means of the removal plate 2'. In this case the post-cooling plates 28 are provided in a shelf arrangement which makes it possible for a set of moldings 1 always to be in a condition of being cooled down while a set of moldings 1 is being transferred from the removal plate while a further set of moldings 1 is being ejected.

The Figure shows what is referred to as a horizontal system in which the mold tool halves open in a horizontal direction. In principle however it would also be possible to use a vertical system.

While all previously illustrated embodiments of the receiving system 4, 4', 4" provide a removal plate 2, 2' to remove the moldings 1 from the tool in the closure unit 3 and to transfer them on to the receiving fingers the alternative embodiment shown in FIGS. 8 and 9 does not have any such removal plate. The function of the removal plate is performed by the post-cooling plates 28'. For that purpose the post-cooling plates 28' are movable into the closure unit and there take the moldings 1 directly from the cavities 24' of the mold.

While in FIG. 7 the closure unit 23 of the injection molding apparatus is shown as being still in the closed condition and moldings 1 are just being ejected from one of the post-cooling plates 28' FIG. 8 shows the closure unit 23 in the opened condition. In that case one of the post-cooling plates 28' has been moved into the closure unit. It will be clear from this Figure that, if the aim is to maintain the procedure of filling the mold cavities from their closed end, that manner of removal represents a departure from the previous principles of the mold structure. After the closure unit 23 is opened the closed neck jaws 26' remain at the cavities 24' of the mold cavity structures so that the moldings 1 also remain in the cavities 24' while the cores 25' are withdrawn from the moldings 1. After the neck jaws 26' are moved apart the moldings 1 can be received by the post-cooling plate 28". For that purpose, as shown in FIG. 9, the fingers 5 of the plate 28" are introduced into the hollow body moldings 1 which fit in the cavities 24" of the mold. After the fingers 5 engage into the interiors in the moldings 1 the moldings are gripped by the fingers 5 for example by means of a vacuum, removed from the cavities 24" and cooled outside the closure unit 23 on the same fingers 5.

FIGS. 2 and 3 will now be described for a more detailed understanding of the structure of the receiving fingers 5 and the mode of operation thereof.

FIG. 2 shows a side view in section of a receiving finger 5 and by way of example the fixing thereof to a post-cooling plate 28 of the receiving system 4. An identical finger can also be used for all other embodiments of post-cooling plates or cubes. The core 12 of the receiving finger 5 has an outside surface 13 which substantially corresponds to the shape of the inside surface 14 of the preforms 1.

To hold the preform 1 on the core 12 of the receiving finger 5 the illustrated embodiment has a vacuum system. A reduced pressure is applied by way of the passage 15 which is provided in the interior of the core 12 and which in the region of the tip 16 of the core 12 has an opening in the outside surface 13 of the core 12. That reduced pressure sucks the bottom of the preform 1 so that the preform is held on the core 12. That reduced pressure can also be used in the transfer position of the set 6 of receiving fingers 5 in FIG. 1 to remove the preforms from the removal plate 2. The passage 15 can be connected by way of a connection 17 selectively to a vacuum means for producing a reduced pressure, as described hereinbefore, or to an increased pressure means. For stripping the preform 1 from the core 12 in the position of the set 8 in FIG. 1 the passage 15 is subjected to the action of a slightly increased pressure so that the preform 1 is expelled from the core 12.

In order to be able to overcome higher withdrawal forces between the preform 1 and the core 12 there is provided a movable support ring 18 which embraces the core 12 of the finger 5 and on which the neck 19 of the preforms 1 is supported. The support ring 18 can be moved along the core 12 of the finger 5 so that a force is exerted on the neck 19 of the preform 1 in the stripping direction.

The support ring 18 also serves as an abutment for the edge of the bottle neck. By means of the support ring, this arrangement establishes how far the core 12 of the finger engages into the molding 1. As both the inside surface of the preform 14 and also the outside surface 15 of the finger define conical bodies, the depth of penetration of the core 12 into the molding 1 decisively determines the removal forces which after cooling and therefore after shrinkage of the molding 1 are required to eject the molding 1 from the core 12 of the finger.

The core 12 shown in FIG. 2 has a water through-flow cooling arrangement, wherein a feed and a discharge 20, 21 is provided concentrically around the vacuum or compressed air passage 15 in the center of the core 12. The radial arrangement of the passages 15, 20, 21 is to be clearly seen in a horizontal sectional view of the receiving finger 5 in FIG. 3.

In the illustrated embodiment the periphery of the outside surface 13 is smaller at all locations along the longitudinal axis of the core 12 by about 0.1 mm than the inside diameter of the preform 1 in the hot condition in which the preform 1 is removed from the mold cavity of the tool and transferred to the cooling finger. In that fashion, even after shrinkage of the material of the preforms 1 upon cooling thereof, the stripping forces between the inside surface 14 of the preform and the outside surface 13 of the core 12 are so low that the preform 1 can be removed from the finger by means of the compressed air through the passage 15 and the stripping ring 18.

If this is desirable, as shown in FIG. 1, the support ring 18 diagrammatically shown in FIG. 2 can be replaced by a stripping plate which has bores in the region of the individual fingers 5. In that way, by means of a single movement of the plate, all preforms on the fingers 5 of a set of fingers can be stripped therefrom all at once.

In the illustrated embodiment the core 12 of the receiving finger 5 comprises a one-piece hollow body. The hollow body is fitted into an aperture 31 in the post-cooling plate 28 and fixed to the post-cooling plate by means of a clamping ring 31 screwed to the post-cooling plate 28. In that arrangement the hollow body is sealed in relation to the post-cooling plate 28 by means of an O-ring so that the cooling fluid cannot issue from the post-cooling plate 28 or the finger 5. The passages 15, 20, 21 in the interior of the core 12 are formed by concentrically arranged tubes 33, 34. In that case the radially outer tube 33 is arranged in such a way that the outside wall thereof is at a spacing relative to the core 12 so that the return passage 21 for the cooling fluid is formed. The radially inner tube is again at a spacing from the radially outer tube 33 so that the feed passage 20 for the cooling fluid is formed. The ends of the tubes 33, 34, that are towards the plate, are fitted into the post-cooling plate 28 in such a way that the feed passage 20 and the return passage 21 communicate with the inlet passage 35 and the outlet passage 36 respectively of the post-cooling plate. The tubes 33, 34 are soldered to a centering plate 37 at their ends which are in the region of the tip 16 of the core 12. The centering plate 37 is sealed in relation to the core 12 by means of an O-ring 38. The radially outward tube 33 terminates at the centering plate 37, having in that region through bores 40 which, distributed over the periphery thereof, provide communications between the feed passage 15 and the return passage 21.

The radially inward tube 34 engages both through the centering plate 37 and also through the tip 16 of the core 12 so that it forms a communication for the passage 15 with the outside surface 13 of the core 12. In that case the end of the tube 34 is soldered to the tip 16. The end of the tube, that is towards the plate, engages into the compressed air or vacuum passage connection 17 of the post-cooling plate 28. In that case the end of the tube 34 is sealed in relation to the post-cooling plate 28 by means of an O-ring 39 so that the cooling fluid cannot penetrate into the passage 15.

Turbulence-generating means can be provided in the return passage 21, which provide for a turbulent flow within the return passage 21 to afford a better cooling efficiency. The turbulence-generating means can be for example ribs. Alternatively it is also possible for the walls of the return passage to be provided with a structure. In the simplest case the surface can be roughened.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features is dispensed with here only for the sake of brevity and readability of the description.

LIST OF REFERENCES 1 molding/preform
2, 2' removal plate
3 receiving cavity
4, 4', 4" receiving system
5 receiving finger
6 set of receiving fingers
7 set of receiving fingers
8 set of receiving fingers
9 set of receiving fingers
10 cube
11 conveyor belt
12 core of the receiving finger
13 outside surface of the core
14 inside surface of the preform
15 passage
16 tip of the core 12
17 passage connection
18 support ring
19 neck of the preform
20, 21 passages
22 stripping plate
23 closure unit
24, 24' cavity
25, 25' core
26, 26' neck jaw
27 three-stage post-cooling plate
28, 28' post-cooling plate
30 O-ring
31 aperture
32 clamping ring
33, 34 tubes
35 inlet passage
36 outlet passage
37 centering plate
38 O-ring
39 O-ring

What is claimed is:

1. An injection molding apparatus comprising a) an injection mold for producing a hollow body molding, said mold comprising a core defining an inner surface of the hollow body molding and b) a receiving system (4) for post-treatment of a hollow body molding (1) produced in the injection mold, wherein the receiving system has a receiving finger (5) with a first end and a second end and wherein the receiving finger (5) is so designed that it can engage into the hollow body molding (1), wherein outside shape of the receiving finger (5) substantially corresponds to inside shape of the hollow body molding (1) so that the receiving finger (5) can hold the hollow body molding wherein an outside diameter of the receiving finger (5) is substantially equal to inside diameter of the hollow body molding (1) in a cooled condition so that the hollow body molding (1) can be removed from the receiving finger (5) in such a way that the outside diameter of the receiving finger (5) is between about 0.01 mm and about 1 mm smaller than the inside diameter of the hollow body molding (1) in the removal condition so that the hollow body molding (1) can be removed from the receiving finger (5) even after shrinkage, wherein the receiving finger has a holder (15, 18) comprising at least one opening in the receiving finger (5), which opening can be connected to a vacuum source to hold the hollow body molding, wherein the receiving finger (5) further has an ejection apparatus (18, 22) for stripping the cooled hollow body molding (1) from the receiving finger which ejection apparatus comprises at least one opening in the receiving finger for a fluid flow to strip the hollow body molding from the receiving finger.

2. An injection molding apparatus as set forth in claim 1 wherein heat control apparatus is provided for at least one of cooling and heating the hollow body molding (1) so that the hollow body molding (1) can be selectively cooled or heated.

3. An injection molding apparatus as set forth in claim 2 wherein the apparatus for at least one of cooling and heating produces a cooled or heated fluid flow.

4. An injection molding apparatus as set forth in claim 3 wherein the apparatus for at least one of cooling and heating includes a through-flow passage (20, 21) for a fluid, which is arranged in the receiving finger (5) and which can be connected to the apparatus for producing a cooled or heated fluid flow.

5. An injection molding apparatus as set forth in claim 2 wherein the cooling and/or heating apparatus comprises an electric heater.

6. An injection molding apparatus as set forth in claim 1 wherein the receiving finger (5) has an abutment for a hollow body molding (1) so that the open end of the hollow body molding (1) can be supported thereon.

7. An injection molding apparatus as set forth in claim 6 wherein the abutment is formed by a ring (18) or a plate (22) which embraces the receiving finger (5) in the proximity of its second end so that the open end of the hollow body molding (1) is supported thereon over its entire periphery.

8. An injection molding apparatus as set forth in claim 1 wherein the ejection apparatus (18, 22) has a movable support ring which embraces the receiving finger in the proximity of its lower end and is movable axially along the finger.

9. An injection molding apparatus as set forth in claim 1 wherein a post-treatment sleeve is provided which is movable relative to the receiving finger so that it embraces the receiving finger and the hollow body molding arranged thereon.

10. An injection molding apparatus as set forth in claim 9 wherein the post-treatment sleeve is in the form of a cavity, the inside wall of which approximately corresponds to the outside shape of the hollow body molding (1).

11. An injection molding apparatus as set forth in claim 10 wherein the post-treatment sleeve is of such a configuration that it does not touch the hollow body molding (1).

12. An injection molding apparatus as set forth in claim 1 wherein the receiving system (4) is adapted to receive the hollow body molding (1) outside of a mold closure unit of the injection molding machine, wherein the system (4) is so adapted that it takes over the hollow body molding (1) from a removal plate (2).

13. An injection molding apparatus as set forth in claim 1 that acts as a removal plate for removal of the hollow body molding (1) from an injection molding tool within the interior of the closure unit of an injection molding machine.

14. An injection molding apparatus as set forth in claim 1 wherein there is provided at least one arrangement (6, 7, 8, 9) of receiving fingers (5), wherein the number of receiving fingers in the arrangement (6, 7, 8, 9) corresponds to the number of hollow body moldings simultaneously produced in the injection molding apparatus or an integral multiple thereof, so that all hollow body moldings (1) simultaneously produced in the injection molding apparatus are received by the arrangement (6, 7, 8, 9).

15. An injection molding apparatus as set forth in claim 14 wherein there are provided a plurality of arrangements (6, 7, 8, 9) of receiving fingers (5) arranged on a rotatable holding unit so that the receiving system (4) can successively receive a plurality of sets of simultaneously produced hollow body moldings (1) on the receiving fingers of the various arrangements by rotation of the holding unit.

16. The injection molding apparatus of claim 15 wherein there are four arrangements (6, 7, 8, 9) of receiving fingers (5).

* * * * *